US006891302B1

(12) United States Patent
Gabrys

(10) Patent No.: US 6,891,302 B1
(45) Date of Patent: May 10, 2005

(54) LIGHT-WEIGHT HIGH-POWER ELECTRICAL MACHINE

(76) Inventor: Christopher W. Gabrys, 900 S. Meadows Pkwy. #3513, Reno, NV (US) 89511

( * ) Notice: Subject to any disclaimer, the term of this patent is extended or adjusted under 35 U.S.C. 154(b) by 13 days.

(21) Appl. No.: 10/319,190

(22) Filed: Dec. 13, 2002

Related U.S. Application Data

(60) Provisional application No. 60/407,551, filed on Aug. 30, 2002, provisional application No. 60/394,374, filed on Jul. 8, 2002, provisional application No. 60/385,324, filed on Jun. 3, 2002, provisional application No. 60/382,802, filed on May 23, 2002, provisional application No. 60/358,110, filed on Feb. 19, 2002, provisional application No. 60/340,158, filed on Dec. 15, 2001, provisional application No. 60/340,157, filed on Dec. 15, 2001, provisional application No. 60/237,308, filed on Oct. 2, 2000, and provisional application No. 60/234,960, filed on Sep. 23, 2000.

(51) Int. Cl.[7] .............................................. H02K 31/00
(52) U.S. Cl. ....................... 310/178; 310/266; 310/261
(58) Field of Search ................................ 310/178, 261, 310/266, 254, 74, 177, 180, 90.5, 179; 322/90, 29; 29/596–598

(56) References Cited

U.S. PATENT DOCUMENTS

| 3,858,071 A | 12/1974 | Griffing et al. | 310/266 |
|---|---|---|---|
| 4,797,602 A | 1/1989 | West | 322/10 |
| 4,900,965 A | 2/1990 | Fischer | 310/26 |
| 5,311,092 A | 5/1994 | Fischer | 310/266 |
| 5,504,382 A * | 4/1996 | Douglass et al. | 310/156.25 |
| 5,880,544 A | 3/1999 | Ikeda et al. | 310/74 |
| 5,925,952 A | 7/1999 | Bichler et al. | 310/74 |
| 6,087,753 A * | 7/2000 | Pinkerton | 310/178 |
| 6,118,202 A | 9/2000 | Pinkerton | 310/178 |
| 6,323,573 B1 * | 11/2001 | Pinkerton | 310/178 |
| 6,489,700 B1 * | 12/2002 | Heiberger et al. | 310/178 |

* cited by examiner

*Primary Examiner*—Karl Tamai
*Assistant Examiner*—Leda T. Pham
(74) *Attorney, Agent, or Firm*—J. Michael Neary

(57) ABSTRACT

A brushless electrical machine, usable as a motor, generator, or alternator, has a rotor that is comprised of a rim portion and a substantially open center portion. The rim portion has a partially hollow core in which a stationary field coil is supported. Current to the field coil generates magnetic flux that circulates in a poloidal flux path in the rim, crossing a single magnetic air gap formed by the rim. Protrusions in the rim located around the circumference form poles all having the same polarity. As the rotor rotates, the flux exiting the poles passes through multiple stationary armature windings around the circumference that are located in the single air gap. An AC voltage is induced in the armature windings from rotation.

25 Claims, 12 Drawing Sheets

LIGHT-WEIGHT HIGH-POWER ELECTRICAL MACHINE

This is related to the following U.S. applications:

Provisional Application No. 60/340,158 filed on Dec. 15, 2001, entitled "Light Weight High Power Electrical Machine", patent application Ser. No. 10/017,167 filed on Dec. 15, 2001, and entitled "Homopolar Hybrid Electric Machine", Provisional Application No. 60/394,374 filed on Jul. 8, 2002, and entitled "Compact Heteropolar Hybrid Alternator-Motor", Provisional Application No. 60/358,110 filed on Feb. 19, 2002, and entitled "Airgap Armature for Inductor Alternator Machine", and patent application Ser. No. 10/224,802 filed on Aug. 21, 2002, and entitled "Airgap Armature", Provisional Application No. 60/385,324 filed on Jun. 3, 2002 and entitled "High Performance Axial Gap Alternator Motor", and Provisional Application No. 60/340,157 filed on Dec. 15, 2001, and entitled "Hybrid Vehicle Power System", and 60/382,802 filed on May 23, 2002, and entitled "Parallel Hybrid Electric Vehicle", Provisional Application No. 60/407,551 filed on Aug. 30, 2002, and entitled "Wind Turbine", and Provisional Applications No. 60/234,960 filed on Sep. 23, 2000, and 60/237,308 filed on Oct. 2, 2000, and patent application Ser. No. 09/962,726 filed on Sep. 24, 2001, all entitled "Flywheel Power Source with Passive Generator Cooling".

This invention pertains to electrical machines for converting between electrical and rotational mechanical energy and more particularly to a brushless electrical machine that has high power-to-weight capability, has high efficiency and is low in cost. The invention also provides for significantly reduced complexity and costs in the cooperating electronics.

BACKGROUND OF THE INVENTION

Brushless rotary electrical machines such as motors, generators and alternators have typically suffered from one or more of the following deficiencies, low power capability, heavy weight, low efficiency, complex and costly construction, cogging, and required use of expensive and complex cooperating electronics. One prior art electromotive device that functions as a brushless motor or generator does achieve a very high ratio of power capability to weight through use of many rare earth magnets arranged on a substantially hollow rotor that cooperate with numerous windings wound around flux conducting bars. Unfortunately, this construction is complicated and the use of many rare earth magnets and low loss magnetic conducting bars is expensive. Besides the expense of the electrical machine itself the associated electronics to drive the electrical machine are also expensive. Because the flux in the machine is generated solely by permanent magnets, the induced voltages in the armature windings will be directly proportional to the rotor speed. Complex high frequency switching electronics is usually necessary with such permanent magnet machines to regulate power to and from the electrical machine whether used as a motor or generator. These electronics can be prohibitively expensive for use of the electrical machine in many applications and the life of these electronics can be limiting.

Another type of brushless electrical machine that can overcome the need for costly electronics to provide power regulation is an inductor alternator. The magnetic flux in the electrical machine is provided by a stationary field coil that generates flux through application of an electric current. Proper design of the electrical machine can require only a small field current to generate a large flux by using many turns in the field coil. The power to and from the electrical machine can be controlled simply by varying the current to the field coil. When used as a generator, increasing the field coil current increases the voltage induced in the armature windings for a given rotor speed. When the electrical machine is used as a motor, a synchronous inverter energizes the armature windings to cause the rotor to rotate. Varying the current to the field coil can control the speed and torque. Although such electrical machines can reduce the cost of associated electronics for operation, they are heavy and have provided only a very low ratio of power capability to weight.

SUMMARY OF THE INVENTION

Accordingly, this invention provides a brushless electrical machine that can be used as a motor, generator, or alternator. It achieves a high ratio of power capability to weight, has high efficiency, low cost, and uses associated electronics that can be manufactured for significantly reduced costs. The electrical machine has a rotor that is comprised of a rim portion connected to a center shaft by a hub. The region between the rim and the shaft is a substantially open center portion. The rim portion is made of two pieces enclosing a partially hollow interior core in which stationary a field coil is located. Current to the field coil generates magnetic flux that circulates in a poloidal flux path in the rim, crossing a single magnetic air gap formed by opposed facing surfaces of the two pieces of the rim. Circumferentially spaced protrusions in one of the opposed facing surfaces defining the air gap form poles, all having the same polarity. As the rotor rotates, the flux in the poloidal flux path in the rotor rim is concentrated in the poles, from which it exits, passing through multiple stationary armature windings around the circumference that are supported in the single air gap. Rotation of the poles past the armature windings causes regular flux changes through the armature windings and induces an AC voltage therein.

Because the rotor is substantially open in its center and the force generation occurs in a rim that can be made with a relatively large diameter, the electrical machine achieves a high ratio of power-to-weight. Placement of most of the rotor mass in the rim, away from the center, and the potential of a producing a larger diameter rotor by having reduced mass, allows for generation of more torque and power for a given mass. The forces generated have both a larger moment to develop torque and there is a greater surface area available for placement of armature windings from the rim design. Further, the higher the tip speed of the machine, the higher the induced voltage in the armature windings, and the power is proportional to the square of the induced voltage. The stresses in the rim design have been found to be acceptably low for use in most applications, and operation with a tip speed as high as 250 m/sec using quality steel construction is feasible.

Compared with prior art high power-to-weight ratio electrical machines, electric machines in accordance with this invention have simpler construction and lower costs. The operating flux of the machine is generated in a field coil instead of many individual rare earth magnets. Further, the machine uses air core windings that don't have magnetic cores. The rim can be made by assembling as few as two pieces. The use of a field coil also reduces the complexity and costs of associated electronics for power regulation. The performance of the electrical machine can be controlled by adjusting the current to the field coil to control the voltage induced in the armature windings for a given speed. High frequency switching power conversion and its losses are not required for operation of the electrical machine.

The machine also achieves a high efficiency through several factors. The magnetic path has only a single air gap and a large number of turns in the field coil can be used to reduce the power requirements for flux generation. Both surfaces of the rim on either side of the air gap rotate, so the flux in the rim remains substantially constant, making possible a reduction of eddy current and hysteresis losses without the need for laminations. In one embodiment, for very high efficiency electrical machines or ones that need to operate efficiently at very high speeds, low magnetic loss material can be placed on the surfaces adjacent the air gap. The air core windings have no core hysteresis or eddy current losses. To reduce the eddy current losses in the armature windings themselves, multiple strand individually insulated wire such as Litz wire can be used. The air core windings have lower inductance than iron core windings, which results in less switching losses when the electrical machine is used as a motor and driven by an inverter. The reduced inductance increases the current rise time for high power, faster switching and lower electronic stress. The air core windings have greater reluctance in the air gap than iron core windings, however they allow more room for placement of armature windings, and cogging is eliminated.

Other embodiments of the invention include methods of cooling the armature and field windings. In one embodiment, the rim has holes that allow airflow. If the number and size of the holes are sufficiently low, flux from the field coil will be able to maintain a uniform density before reaching the protrusions or poles. Also, because the rotor rotates and the armature and field windings are stationary, all portions of the windings are equally cooled around the circumference. Air flow through the rim core around the field coil and armature windings can also be induced by circumferentially angled holes in the rim, and/or by using air flow inducing wedges along the side edges of the teeth. Another cooling method includes surrounding the windings in a thin wall vessel for containing a liquid that cools the windings during high power operation.

The machine has many applications and can be used as a motor, generator or alternator. One such application is for use in energy storage flywheel systems. A large inertia steel rim can store significant energy per weight. A solid disc or cylinder can store the highest energy per weight by allowing the highest operating speed. The stored energy is proportional to the peripheral speed. However, for a given desired rotational speed, a rotor in the form of a rim such as that employed in machines in accordance with this invention stores more energy per weight because most of the weight is near the outer diameter of the rotor. This is an advantage of the machine in applications where the rotational speed is limited, such as for operation on mechanical bearings with long life or for lower motor/generator magnetic losses. In prior art inductor alternator flywheel systems, the magnetic losses become significant well below the maximum stress capability of the flywheel. The lower weight of the electrical machine can extend the life of the mechanical bearings and the air core windings eliminate generation of destabilzng radial or axial forces, which along with the reduced weight, can make use of magnetic bearing support easier.

Besides use in flywheel systems that are known to operate at very high tip speeds for storing large amounts of energy, the machine is well suited for and has many advantages in use with externally connected equipment. Most equipment in industrial applications do not rotate at the high speeds of flywheel systems and it is therefore preferable to have high power capability at slower speeds while having low weight. In one embodiment, the electrical machine can be used for one or more functions in hybrid or electrically driven vehicles. The machine can be mechanically coupled to an engine for producing electric power. It can be used in a flywheel system for storing energy on the vehicle, and it can be used to provide motive force for the vehicle by connection with one or more wheels. The low weight of the rotor and the high power-to-weight capability of the motor makes it particularly suitable as a motor for mounting in or adjacent to the wheels of a hybrid electric vehicle for driving each wheel individually.

The low cost construction, high efficiency and controllable attributes of the machine also make it well suited for use in alternative energy generation. In one embodiment, the electrical machine is coupled to a wind blade for use in a wind turbine electric generator. The machine is used as an alternator and converts wind energy to electricity. The field coil allows the output to be controlled despite variations in the wind speed and the light weight makes support of the electrical machine easier.

A further use of the machine is in continuous power systems. The electrical machine serves as a flywheel that is coupled to an engine through a clutch. The rotor is normally rotated by utility power through use of a synchronous inverter. When utility power fails, the rotor continues to rotate due to its rotational inertia and it provides power. If the interruption is extended, the engine is started, the clutch is engaged and the engine rotates the rotor to provide continuous power. Because engines typically rotate at relatively slow speeds, the machine provides continuous power with lower weight and with a potentially longer bearing life.

DESCRIPTION OF THE DRAWINGS

The invention, and its many attendant beneficial features, will become better understood upon reading the following description of the preferred embodiments in conjunction with the following drawings, wherein.

DESCRIPTION OF THE PREFERRED EMBODIMENTS

Figure 1A:
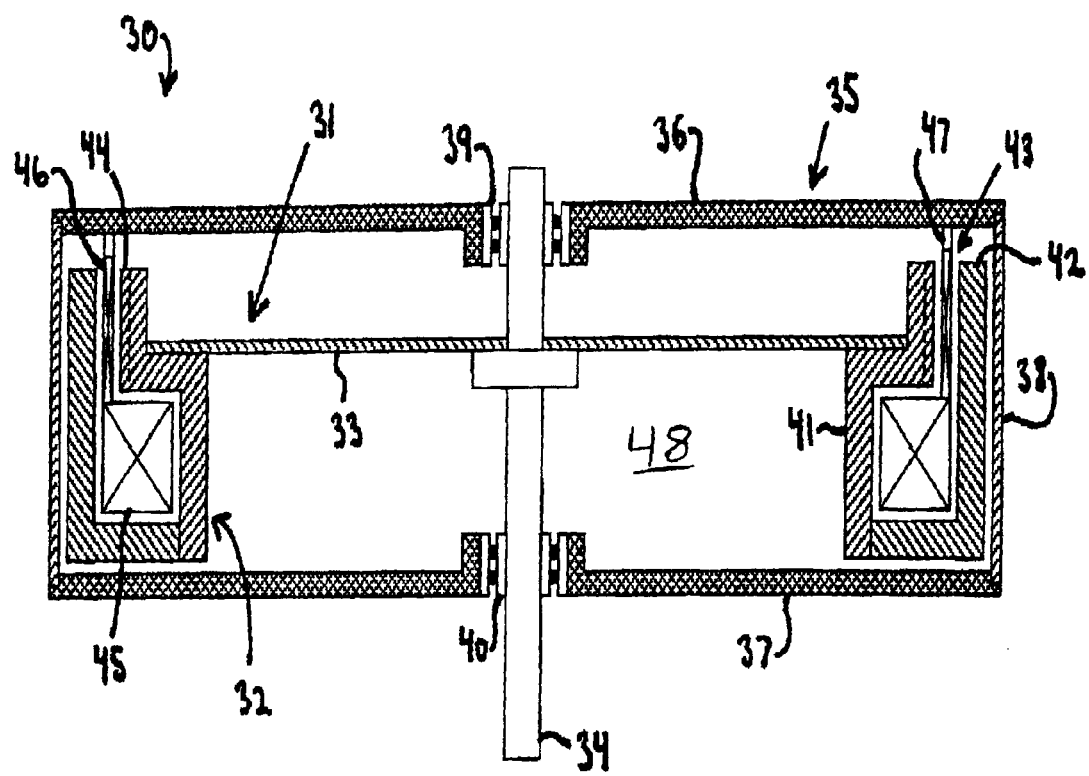
FIG. 1A is a schematic elevation of a lightweight high power electrical machine in accordance with the invention.

Turning to the drawings wherein like characters designate identical or corresponding parts, and more particularly to FIG. 1A, a light weight high power electrical machine 30 in accordance with the invention is shown having a rotor 31 with a rim 32 and a center hub 33. The rotor 31 has a substantially open center portion 48, within the inner diameter of the rotor, except for the hub, to minimize the weight of the electrical machine 30 and maximize the moment of inertia of the rotor 32 about its axis of rotation. This allows the diameter of the rim 32 where force is generated to be made large for maximizing both the torque and power capability of the electrical machine 30. Thus, the power capability of the electrical machine is maximized by having force generation occur at the largest diameter. The open center portion 48 within the rim 32 could be used for other elements used in the application, such as electronic components, a brake or clutch, etc.

The center hub portion 33 is attached to a shaft 34 for transmitting torque between the shaft 34 and the rim 32. For maximum torque and power capability per weight, the moment of inertia of the rim portion preferably has a value greater than 70% of the value of the moment of inertia of the rotor and more preferably greater than 90%. Likewise, the power capability per weight can also be increased with a low mass hub, wherein the rim has a height, H in meters, and an inner diameter, ID in meters, and the substantially open center portion has a mass, M in kilograms, such that:

$$M < 500\pi D^2 H$$

The rotor 31 is contained in a housing 35 which in this case is constructed with upper and lower end plates 36 and 37 and an outer tube 38. The center shaft 34 is journalled for rotation in ball bearing sets 39 and 40 mounted in the upper and lower end plates 36, 37 of the housing 35. Other types of bearings could be used instead, as are well known in the art.

The rim 32 is constructed of ferromagnetic material, preferably steel. The rim 32 has a hollow core with a slot communicating between the core and an external surface of the rim, in this case, an axially facing top surface. The slot is defined by two radially facing surfaces that are radially spaced apart to form a single magnetic air gap 43. The rim 32 can be formed from multiple pieces, however it is most easily constructed using two pieces such as an annular inner piece 41, Z-shaped in cross section, and an annular outer piece 42, L-shaped in cross section. The pieces 41, 42 can be assembled by numerous methods including press-fitting, shrink-fitting, bolting, bonding, welding, brazing, and other mechanical connections and combinations thereof, such as press-fitting and welding, to ensure that the pieces remain connected together during rotation. Multiple protrusions 44 are evenly spaced circumferentially around one or both rim pieces 41, 42 facing the air gap. In the configuration of FIG. 1A, these protrusions 44, which may resemble gear teeth, are included on the rim around the outer circumference of the inner piece 41, and these protrusions 44 act as magnetic poles for operation of the electrical machine 30. The protrusions could also be on the inside surface of the outer piece 42, or could be on both pieces 41 and 42.

A field coil 45, having windings that are coaxial with the axis of rotation of the shaft 34, is located inside the hollow core of the rim 32. The field coil 45 is stationary, mounted on a support ring 47, which also supports the armature windings 46, as noted below. The field coil 45 can be electrically energized to produce magnetic flux that circulates in a poloidal flux path around the rim when electrical voltage is applied to the field coil 45, and produces homopolar flux in the protrusions 44. "Poloidal" flux circulation as used herein means primarily radial and axial flux travel around the rim 32 and across the air gap 43. More than one field coil could be used so long as they are all wound coaxially. The field coil 45 is preferably wound with many turns so that it generates a high level of flux for a small applied field current. A large wire diameter is also preferred to minimize the resistive losses in the coil 45. Both of these factors tend to increase the volume of the field coil and its weight, so a trade-off is made between efficiency, power capability and size and weight.

Multiple armature windings 46 are located in the single magnetic air gap 43 between opposed, radially facing surfaces in the inner and outer pieces 41 and 42. The armature windings 46 are mounted on the stationary support ring 47 in a regular array around the circumference of the slot. The support ring is connected to the upper end plate 36 and is made of electrically non-conducting material such as plastic or quartz that is strong enough to carry the reaction forces exerted on the armature windings 46. The armature windings 46 have an air core for low losses and low inductance, and preferably fill the air gap 43 around the fill circumference of the rim 32 for maximum power capability. Multiple armature windings 46 can be connected together to produce a three-phase machine, which is standard in many electrical machines, although not required. Partial overlapping of windings of adjacent phases can be done to maximize the amount of armature windings 46 in the air gap 43. For high power electrical machines and/or when very low loss is desired, the armature windings 46 may be wound using multiple strand, individually insulated conductor wire such as Litz wire, minimizing the eddy currents within the armature windings 46. The windings are preferably potted in epoxy to make them rigid and securely attached to the support ring 47, and to improve heat transfer. Even if a small amount of ferromagnetic material were used to support the armature windings 46, the windings would remain essentially air core.

As the rotor 31 rotates, the homopolar flux through the protrusions 44 causes the flux through armature windings 46 to vary. The homopolar flux from protrusions 44 therefore induces an alternating voltage in the armature windings 46 when the rotor rotates 31. Varying the current to the field coil 45 controls the level of flux through the armature windings 46. The electrical machine achieves a high level of efficiency in part because both surfaces of the rim 31 facing the air gap 43 rotate. Magnetic losses are therefore minimized even without the use of laminations because the flux path rotates with the rotor 31.

The electrical machine can function as a motor, generator or alternator. To function as a motor, synchronized electrical power is applied to the armature windings 46 such that individual windings are energized in sequence, each attracting the nearby protrusion to align with the energized coil and causing the rotor 31 to rotate. A synchronous inverter, not shown, using feedback of the rotor position can be employed.

Because the rotor 31 is homopolar, a simple homopolar drive arrangement can be used where the armature windings are simply energized by a single transistor per coil using a feedback sensor, not shown, such as an optical or Hall effect sensor. Feedback could also be provided using the armature windings 46 for sensing. The current to the field coil 45 can then be adjusted for simple control of the torque and speed of the rotor 31. The torque and speed could also be controlled by modulating the power to the armature windings 46 but this is more complex and costly and is not preferred. The power to the armature windings can be many times higher than the power to the field coil 45. This is one of the benefits of the invention over prior art light weight high power electrical machines. Previous machines required switching of the high power levels of the armature windings because the flux was generated by permanent magnets and was fixed. High frequency switching was also required to modulate the power efficiently and this is more costly. The machine 30 allows control through use of a small field current, and high frequency switching is not required. In some cases, a single transistor or amplifier operating in the linear region can be used to control the field current if sufficiently low.

To function as a generator or alternator, the electrical machine 30 is driven rotationally by the shaft 34, and electrical power is removed through the armature windings 46. Current applied to the field coil 45 generates the flux in the protrusions 44 and air gap 43 for operation. To increase the generated voltage for a given rotational speed, the current to the field coil is simply increased. Likewise, to reduce the output power, the current to the field coil is reduced.

Some prior art inductor alternator machines with a large diameter have shown use of a radially solid construction, without a central hole, for increasing the tip speed capability of the rotor, up to 250 m/sec. However, I have found that a steel rim design in accordance with this invention, having a very large central opening, can operate at 250 m/sec tip speed. Further, I have also found that the use of axial bolt holes for holding together rotor halves of prior solid machines significantly negates any benefits gained by having radially solid construction. I have also found that the requirements of most industrial applications for machines in accordance with this invention will be met by operation at much lower speeds so solid construction in such applications is both unnecessary and undesirable.

Figure 1B:
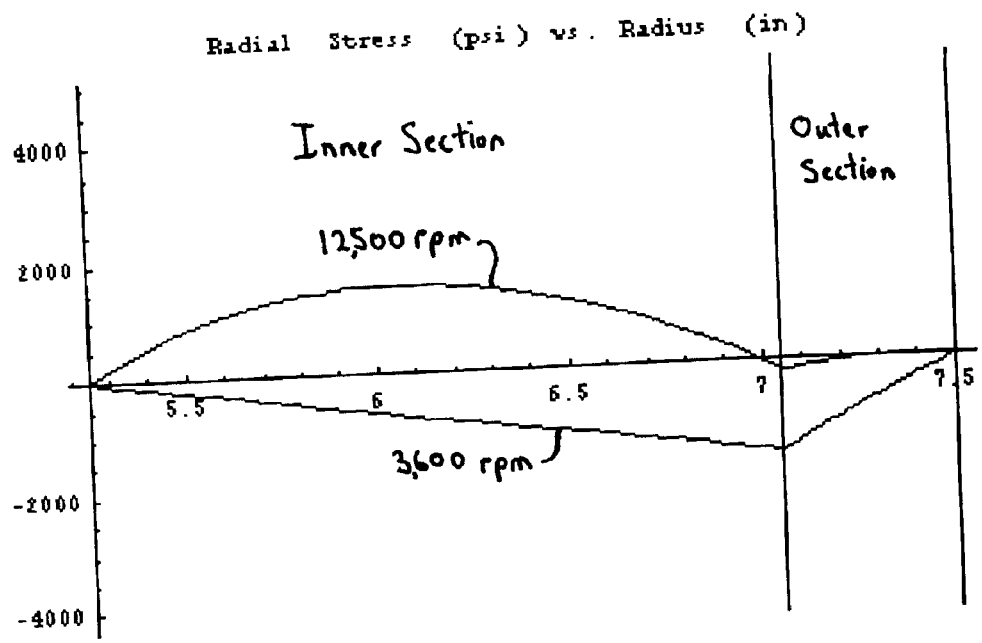
FIG. 1B is a graph showing radial stress distributions in the electrical machine of FIG. 1A rotating at 3,600 rpm and 12,500 rpm.

The radial stress distributions in the electrical machine 30 of FIG. 1A rotating at 3,600 rpm and 12,500 rpm are shown in FIG. 1B. The outer diameter of the rim 32, chosen for this example to illustrate the stress plots, is 15 inches. The inner and outer sections or pieces 41, 42 are assembled together by a modest thermal shrink-fit. The stress is directly proportional to the tip speed. At 12,500 rpm, the rotor rotates with a tip speed of 250 m/sec. The inner and outer sections remain together in slight radial compression, the outer section is completely in radial compression, and the inner section has a radial stress of less than 2 ksi. At 3,600 rpm, at which the tip speed is 70 m/sec and corresponds to more common operating speeds, the inner and outer sections are completely in radial compression.

Figure 1C:
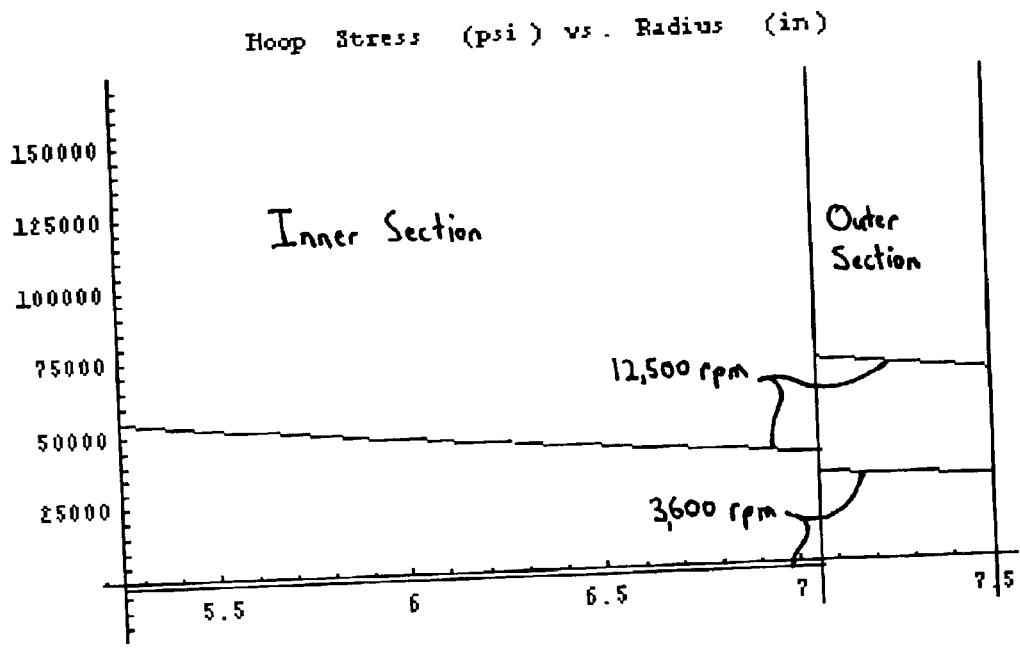
FIG. 1C is a graph showing hoop stress distributions in the electrical machine of FIG. 1A rotating at 3,600 rpm and 12,500 rpm.

The hoop stress distributions in the electrical machine 30 are shown in FIG. 1C. At 12,500 rpm, the hoop stress in the inner section reaches 55 ksi and, in the outer section with a larger diameter, the hoop stress reaches 70 ksi. This is well below the yield strength of many alloy steels that are quenched and tempered. At 3,600 rpm, the inner section is completely in hoop compression and the outer section has a hoop stress of only 30 ksi.

The interference between the inner and outer sections can be adjusted to alter these stresses. As can be seen from the stress plots, the machine 30 can operate at higher operating speeds than those used by most industrial applications. The rim configuration significantly reduces the weight compared to a solid design. For the same weight, the machine 30 could alternatively be made with a larger diameter, allowing an exponential increase in power capability.

Figure 2:
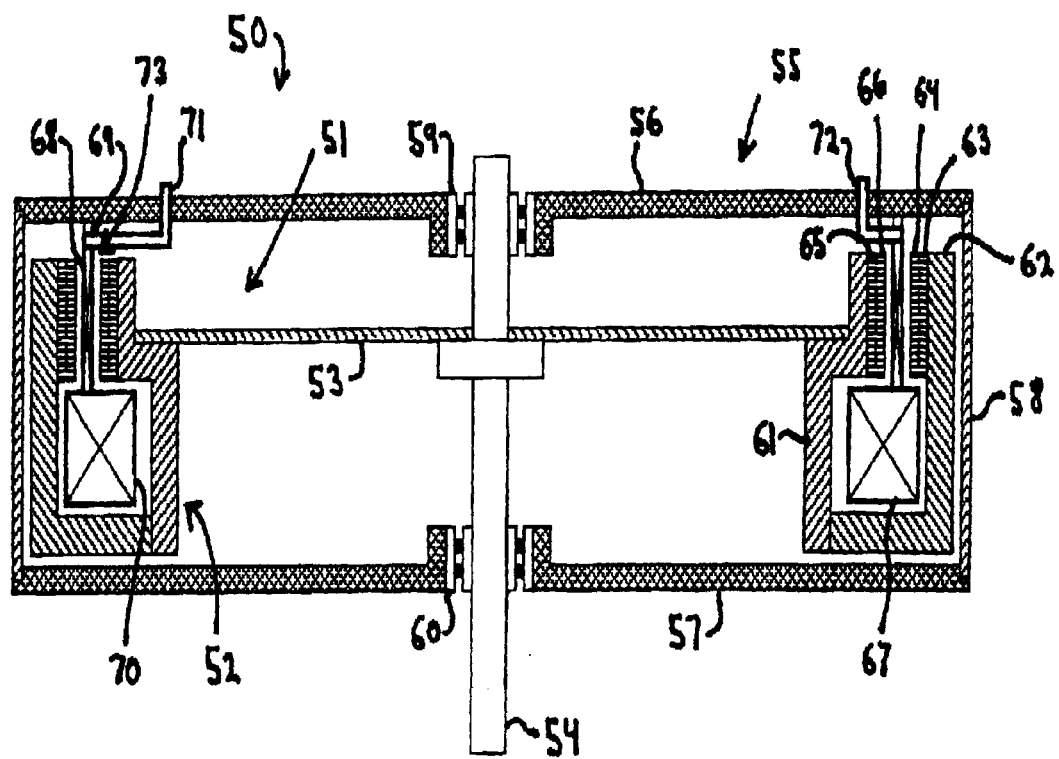
FIG. 2 is a schematic elevation of another configuration light weight high power electrical machine in accordance with the invention.

Another configuration electrical machine 50 in accordance with the invention, shown in FIG. 2 includes a rotor 51 having a rim portion 52 attached to a center shaft 54 by a hub 53. Except for the hub 53 and the shaft 54, the center of the rotor throughout its inner diameter is substantially open. The hub 53, which can be a metal plate or other sufficiently strong and rigid structure to support the weight of the rotor rim 52, is attached to the center shaft 54 for transferring torque between the rim 52 and the shaft 54. For high tip speed applications, the hub 53 must match the radial growth of the rim 52. Bending sections, elastic elements or splines can be used.

The rotor 51 is enclosed in a housing 55 constructed from end plates 56 and 57 and an outer tube 58. Other housing configurations well known in the art of electric machines could also be used. The center shaft 54 is supported for rotation on mechanical bearings 59 and 60 that are mounted in the end plates 56 and 57.

The rim 52 is constructed from an annular inner piece 61 that is Z-shaped in cross-section as shown, and an annular outer piece 62 that is L-shaped in cross-section as shown. Both inner and outer pieces 61, 62 are made of ferromagnetic material such as steel. The inner and outer pieces have opposed facing surfaces that define therebetween a core cavity for a field coil 67 and a slot communicating from the core cavity to the axial top surface of the rim 52. The slot constitutes a single annular magnetic air gap 73 in which stationary armature windings 68 are supported on an electrically insulating support ring 69.

In this configuration of the invention, the efficiency is even further increased by the use of inserts 63, 65 lining the opposed facing surfaces of the slot. The inserts, which define the surfaces of the air gap 73, are made of low magnetic loss material, such as laminated, compressed porous metal, ferrite or other materials that have low eddy current and hysteresis losses. The inserts 63, 65 each have protrusions 64 and 66 that are radially aligned. As with all configurations of the electrical machine in accordance with this invention, the protrusions can be on one or both surfaces adjacent the single magnetic air gap. The low loss inserts 63, 65 minimize losses from the magnetic variations from the stationary armature windings 68.

The field coil 67 is wound coaxially with the rotor 51 and is located in the core cavity between the two pieces 61, 62 of the rim 52. The field coil produces flux that travels in a poloidal flux path through the pieces 61, 62 and traverses the magnetic air gap 73. The multiple armature windings 68 located in the air gap 73 receive the flux from the field coil 67, which induces an AC voltage in the armature windings 68.

Another aspect of the invention is illustrated in this configuration. The power of the electrical machine 50 can be increased by increasing power to the field coil or armature windings, and providing cooling to remove generated heat. The armature windings 68 and field coil 67 are cooled by enclosing them in a thin wall vessel 70 containing cooling fluid. The fluid can be static or circulate passively by convection, or alternatively it can be pumped using inlet and outlet ports 71 and 72. The vessel 70 can be constructed from numerous materials however, materials with low electrical conductivity and permeability are preferred for the lowest magnetic losses. If the vessel 70 is sufficiently thin, metal effectively can be used. The support 69 also supports the vessel on the stationary end plate 56.

Figure 3:
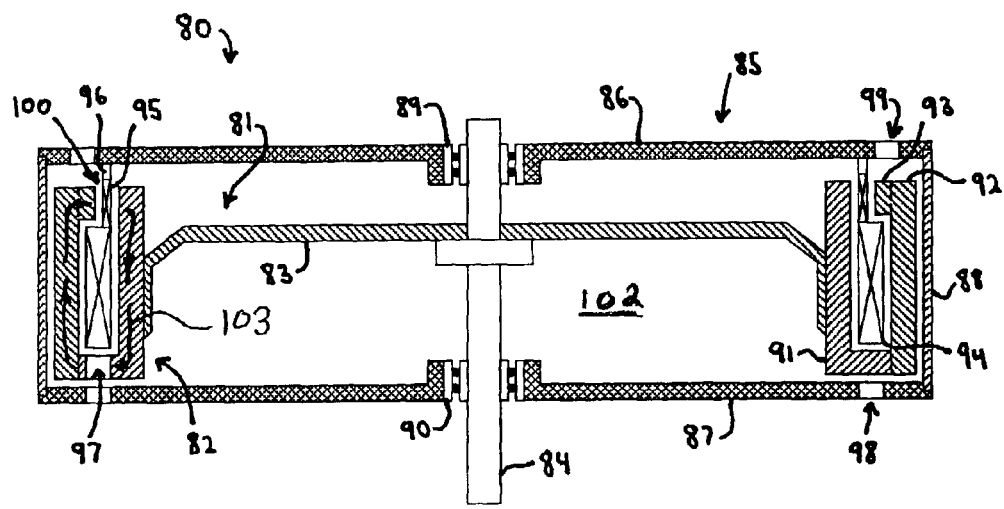
FIG. 3 is a schematic elevation of another configuration light weight high power electrical machine in accordance with the invention.

Another configuration light weight high power electrical machine 80 in accordance with the invention, shown in FIG. 3, is comprised of a rotor 81 having a rim 82 connected by a hub 83 to a center shaft 84. The center portion 102 across the inner diameter of the rim 82 is substantially open except for a hub 83 and shaft 84. The rotor 81 is enclosed in a housing 85 formed from end plates 86 and 87 and an outer tube 88. The shaft 84 is supported by mechanical bearings 89, 90 attached to the end plates 86, 87.

The rim 82 is constructed of two 'L' shaped pieces 91 and 92 that are interference assembled together. The outer piece 92 has inwardly facing protrusions 93 circumferentially spaced in a uniform annular array around the top inside periphery of the outer piece 92. Located in a core cavity between the pieces 91, 92 is a coaxially wound field coil 94 that is made sufficiently large for generating a large flux. Flux from the field coil 94 traverses a poloidal flux 103 path around the rim 82, including a magnetic air gap 100 in a slot at the top of the core cavity, passing through armature windings 95 in the air gap 100 to generate AC voltage as the rotor 81 rotates. The armature windings 95 and field coil 94 are supported using a mount 96 made of electrically nonconductive material that is attached to the end plate 86.

Figure 3B:
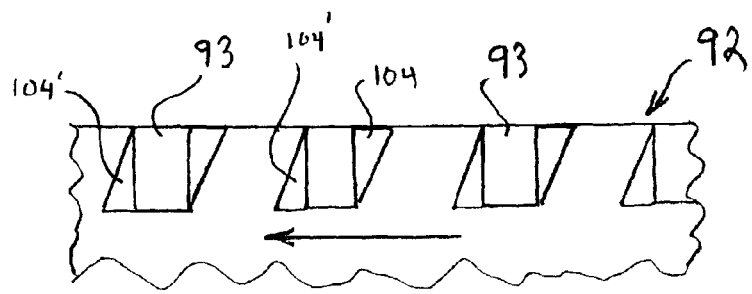
FIG. 3B is a developed or unrolled elevation of a portion of the inside top peripheral surface of the outer piece of the rim in FIG. 3, modified to include air flow inducing wedges.

The electrical machine 80 illustrates another aspect of the invention, wherein cooling of the field coil 94 and the armature windings 95 is provided by airflow. The rim has openings or holes 97 to allow airflow around the field and armature windings 94, 95. These holes can be round, slotted or of irregular shape. If they have circumferentially angled surfaces, they can act as a fan and will force air through the rim 82 by rotation. The holes 97 are preferably not made too large such that they impede flow of the magnetic flux from the field coil 94. Holes 98 and 99 in the end plates 86, 87 are preferably used to allow air to enter and exit the housing 85. Air flow can also be induced by the use of wedge-shaped inserts 104 adjacent each of the protrusions, angled as shown in FIG. 3B to move air upward out of the air gap 100, or downward through the air gap into the core cavity between the pieces 91, 92. The inserts 104 preferably are made of non-conductive and non-magnetic material such as nylon or fiberglass to avoid interfering with the magnetic operation of the machine.

Figure 3A:
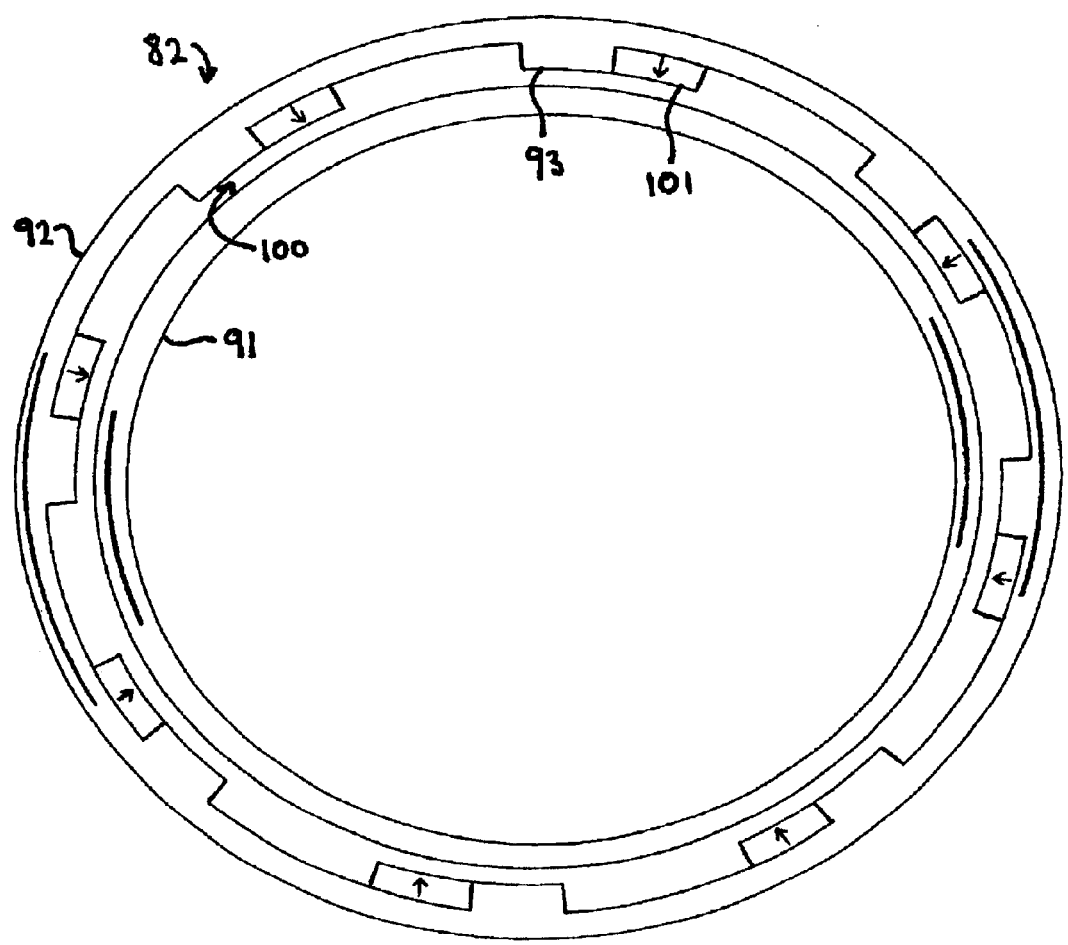
FIG. 3A is a schematic plan view from the top of the rim from the electrical machine shown in FIG. 3, with added magnets to become a hybrid machine.

The output power per field coil current of the machine shown in FIG. 3 can be increased, while still maintaining high efficiency, by the use of permanent magnets 11 in the rim to produce a hybrid machine as shown in FIG. 3A. Radially magnetized permanent magnets 101 are placed on the outer piece 92 adjacent to or in between the inwardly facing protrusions 93 to generate flux across the air gap 100. The magnets 101 can completely fill the space between protrusions 93 or can only partially fill the space as shown. Likewise, the magnets 101 and protrusions 93 can be made of equal arc lengths as shown or differing arc lengths depending on the desired permanent magnetic flux and controllable field flux of a particular design.

The magnets 101 can be oriented to generate flux in the same direction as the field coil flux through the protrusions 93 or they can be opposing. If the flux from the permanent magnets 101 is in the same direction as the protrusions, the total flux through the armature windings, not shown, in the air gap 100 will not change polarity from rotation of the rim 82. The induced voltage in the armature windings, not shown in FIG. 3A, will be maximum with zero field current and will decrease with increasing field current which may be beneficial in some applications but probably not most. As shown, the magnets 101 can be made to not completely fill the gaps between protrusions 93 so that the flux will vary between the combination of the field and permanent magnet fluxes and zero flux during rotation. Increased power may be obtained by alternating the polarity of the magnets 101 with respect to the flux through the protrusions 93 and completely filling the space between protrusions with magnets. This causes the flux through the air gap 100 and armature windings, not shown, to alternate polarity during rotation of the rim 82. Because the inner and outer pieces 91, 92 rotate with the magnets 101 and protrusions 93, and because the armature windings, not shown, have air cores, magnetic losses are precluded. The addition of magnets to the rotor adds mass that can increase stress in the rim and increase cost, and can limit the maximum operating speed, but in some applications these deficiencies are outweighed by benefits of having magnets for added flux generation.

A hybrid version of the electrical machine is preferably constructed as shown where the magnets 101 are supported against centrifugal loading, which is easily accomplished by placing them along with the protrusions on the outer piece of the rim. The magnets could also be attached by other methods including bonding.

In operation, the permanent magnets 101 provide flux through the air gap 100 without power to the field coil, not shown in FIG. 3A. Applying current to the field coil can increase the flux and induced voltage in the armature windings or alternatively can reduce the induced voltage by applying reverse polarity. If the magnets 101 completely fill the spaces between protrusions 93, the induced voltage is turned off by generating an equal flux in the same direction as the magnets 101 so that the flux across the air gap 100 does not change from rotation of the rim 82. In all configurations of the hybrid embodiment, the performance will likely be affected by leakage flux from the permanent magnets directly to the protrusions if they are placed directly adjacent.

Figure 4:
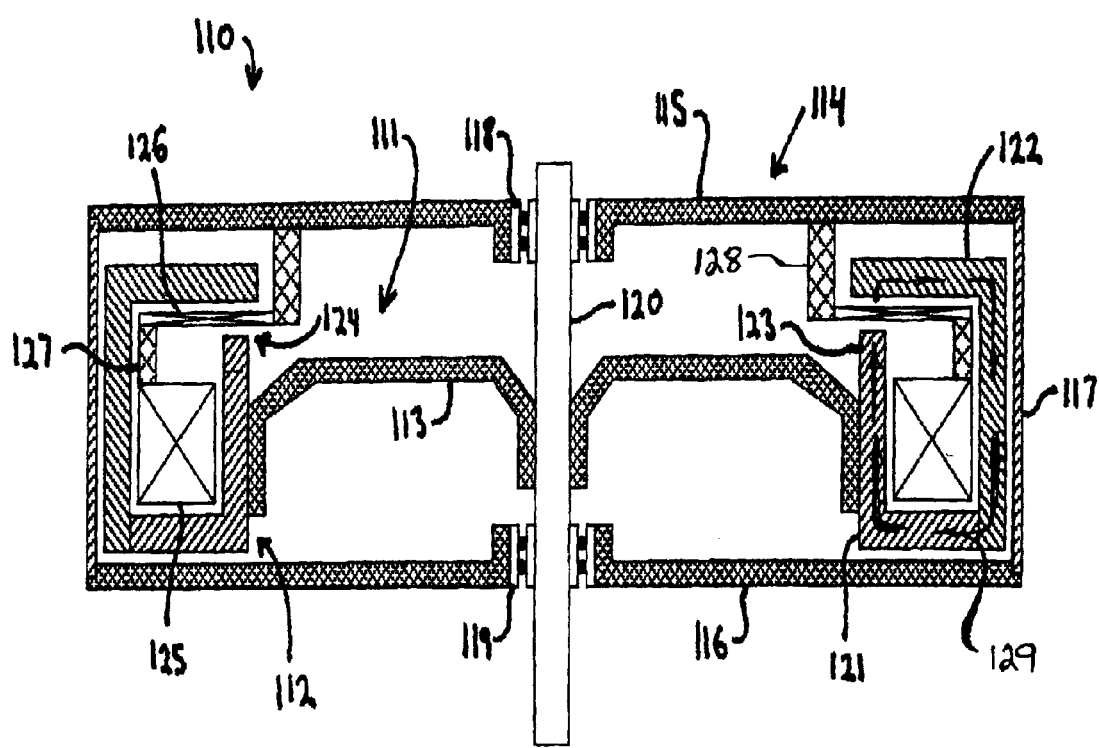
FIG. 4 is a schematic elevation of another configuration light weight high power electrical machine in accordance with the invention.

Instead of a radial air gap, as in the previous configurations, the electrical machine in accordance with this invention can have an axial air gap opening in a radial side of the rim, as illustrated in FIG. 4, wherein another configuration light weight high power electrical machine 110 is shown. The electrical machine 110 is comprised of a rotor 111 with an annular rim 112 and a substantially open center in the inner diameter of the rim 112, except for a hub 113 used to connect the rim 112 to a center shaft 120. The rotor is enclosed in a housing 114 constructed from end plates 115, 116 and an outer tube 117. The shaft 120 is supported on bearings 118, 119 attached to the end plates 115, 116. The rim 112 is constructed of two annular pieces 121 and 122, each having an L-shape in cross section as shown in FIG. 4. In this configuration of the electrical machine, a core cavity between the inner and outer pieces 121 and 122 contains a field coil 125, and a radially opening slot communicates from the core cavity to the inner radial surface of the rim 112. The upper and lower surfaces of the slot define an axial air gap 124 in which armature windings 126 are supported on a support ring 128.

The inner piece 121 of the rim 112 has circumferentially spaced protrusions 123 in a regularly spaced array around one or both edges of the slot, acting as magnetic poles for the electrical machine 110. The axial magnetic air gap 124 is defined between the protrusions 123 and the downward-facing adjacent surface of the outer piece 122. The field coil 125 produces flux that circulates in a poloidal flux path 129 in the rim 112, crossing the air gap 124 and passing through the armature windings 126 in the air gap 124. AC voltage is induced in the multiple air core armature windings 126 as the rotor carries the flux-concentrating protrusions past the armature windings 126 located in the air gap 124. A support member 127, attached to the support member 128, supports the field coil 125 in the core cavity.

Figure 5:
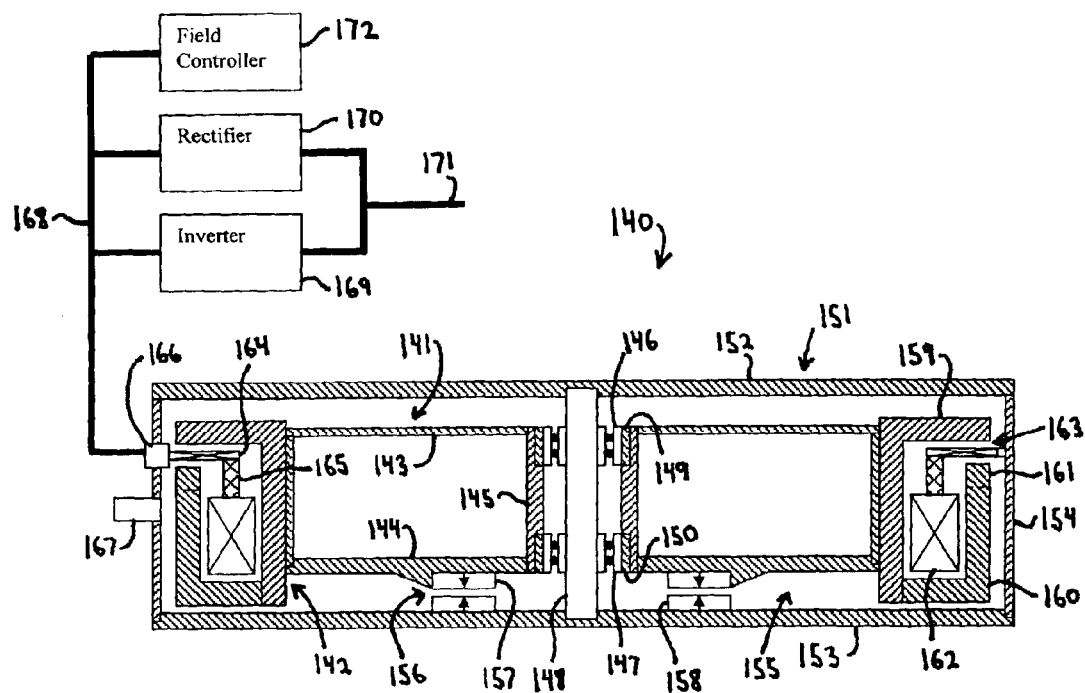
FIG. 5 is a schematic elevation of a flywheel energy storage system using a light weight high power electrical machine in accordance with the invention.

One of the uses of the invention is in flywheel energy storage systems. The inertia of the rotor can be made large enough to store the desired amount of energy or, alternatively, a flywheel can be attached to the electrical machine. Such a flywheel energy storage system 140 using a light weight high power electrical machine is shown in FIG. 5, including a rotor 141 with an annular rim 142 having sufficient mass to store the required amount of energy at the designed rotational speed of the machine. The rim 142 is attached to a center tube 145 through use of upper and lower high-elongation hubs 143, 144. The tube 145 is supported for rotation about a fixed center shaft 148 on upper and lower mechanical bearings 146, 147. Compliant members 149, 150 can be used to allow the rotor 141 to spin about its mass center at lower speed and can reduce bearing loads. The use of compliant members, although not required, is made possible by another special attribute of the invention: because the armature windings have air cores, no destabilizing magnetic forces are produced by the electrical machine. Electrical machines using ferromagnetic core coils exhibit a strong attraction that tends to pull the rotor in one direction or another. The flywheel can be supported effectively even with very soft compliant members and a radial magnetic air gap.

The absence of radial or axial destabilizing magnetic forces in the electrical machine can also facilitate easier implementation of lower stiffness magnetic bearings instead of or in addition to mechanical bearings. To extend the life of the mechanical bearings 146, 147 in the flywheel system 140, the weight of the rotor 141 is preferably carried by a magnetic bearing. In the configuration shown, a magnetic bearing 156 carries the weight of the rotor 141. The magnetic bearing 156 uses a ring magnet 157 attached to the lower hub 144 that axially repels a stationary ring magnet 158. The ring magnets 157, 158 can be solid or made of multiple pieces.

The rotor 141 is enclosed in an evacuated chamber 155 within a sealed container 151 for reduction of aerodynamic losses. For low speed systems, a helium atmosphere can be used instead of a vacuum. The container 151 is assembled from upper and lower end plates 152, 153 and an outer tube 154 that are sealed or welded together.

The rim 142 is constructed from an inner annular piece 159 and an outer annular piece 160 that are shrunk fit together around a coaxially wound field coil 162 and an armature 164. The rim pieces 159, 160 are preferably constructed from high strength ferromagnetic steel such as quenched and tempered 4340 steel to allow rotation to the highest speed. Ferromagnetic steels both provide the flux path and they typically can achieve higher strengths than nonferrous metals. The outer piece 160 has an annular array of equally circumferentially spaced protrusions 161 adjacent an axial magnetic air gap 163 formed by a slot opening on the radial outside surface of the rim 142. The slot communicates between the exterior surface of the rim 142 and a core cavity defined between two inside facing opposed surfaces of the inner and outer pieces 159, 160. The field coil 162 is enclosed in the core cavity inside the rim 142 and is supported on a vertical leg of a support ring 165. Air core armature windings 164 are supported in the air gap 163 on a horizontal leg of the support ring 165, which extends radially out through the slot and is connected to the side wall 154 of the container 151 to support the field coil and armature, and to react the torque exerted on the armature. The armature windings are used to accelerate and decelerate the rotor 141 for storing and retrieving energy.

Electrical wires 168 from the field coil 162, armature windings 164 and any additional sensors, not shown, exit the container 151 through a vacuum-tight feedthrough 166. A vacuum is pulled through a port 167. A vacuum pump, not shown can be left connected to the port 167 or an internal vacuum generation method can be employed such that the port 167 can be pinched off and sealed.

The flywheel energy storage system can be used for many applications including providing long term back up power, short term intermittent power and storing energy from alternative generation sources. The flywheel system 140 shows one method of electrical connection. The armature windings 164 are connected to the output of a synchronous inverter 169. The inverter 169, which can provide AC or pulsed DC to the armature windings 164, accelerates the rotor 141 for storing energy. When energy is to be extracted from the flywheel system 140, the induced voltage in the armature windings 164 from rotation of the rotor 141 is rectified through a rectifier 170. A field controller 172 controls the current to the field coil 162 to maintain a desired output voltage as the speed falls. It can also adjust the acceleration rate. The rectifier 170 and inverter 169 can be connected together to a single DC buss if desired. Other methods of operation could also be used including use of a bi-directional inverter with 4-quadrant control, however this increases cost and complexity.

Figure 6:
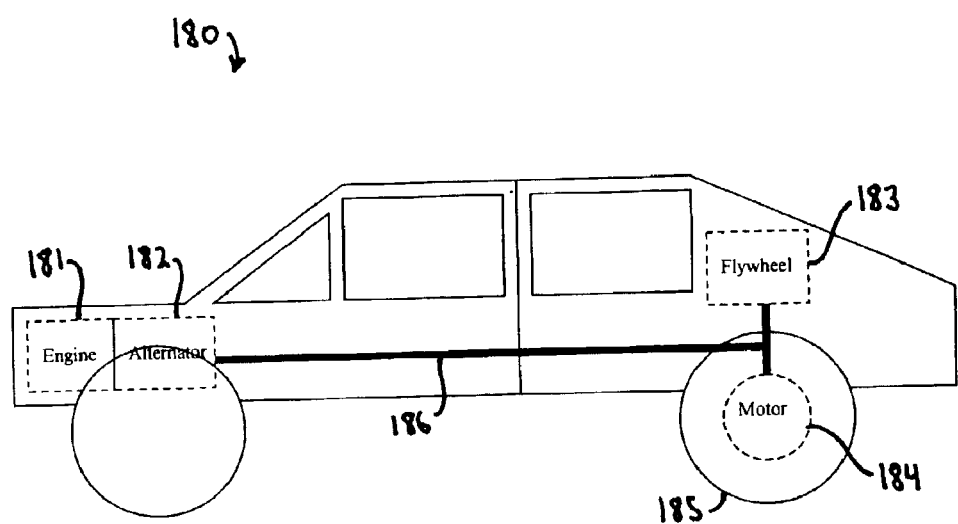
FIG. 6 is a schematic elevation of a hybrid electric vehicle using light weight high power electrical machines in accordance with the invention.

Another promising use for the light weight high power electrical machine is in hybrid or electrically driven vehicles. In this application, the invention can be used for either storage of energy, generation of energy, and/or for motive force for the vehicle. A hybrid electric vehicle 180 using light weight high power electrical machines in accordance with the invention is shown in FIG. 6. The vehicle 180 uses a heat engine, such as an internal combustion engine, a Stirling engine, or fuel burning turbine 181 for converting fuel energy to rotational energy. The engine 181 is mechanically coupled to a light weight high power electrical machine 182 that is operating as an alternator for generation of electrical power for the vehicle 180. Some of the energy is stored in a flywheel energy storage system 183, such as the flywheels shown in FIG. 5 or 9, or a different flywheel coupled to another electrical machine in accordance with the invention, not shown, for accelerating and decelerating the flywheel 183. The flywheel system 183 stores excess energy from the alternator 182 and from regenerative braking. It also supplies energy to accelerate the vehicle 180. The vehicle is driven by yet another electrical machine 184 which functions as a motor/alternator. The motor/alternator 184 is attached to one or more wheels 185 or alternatively multiple units attached to multiple wheels could also be used. Electrical power transfers between the motor/alternator 184, flywheel 183 and alternator 182 through the use of electrical connections 186 and electronics, not shown. Although shown for use in the energy generation, energy storage and vehicular motive force, the invention could alternatively be applied for use in only one or two of these functions. Likewise, the invention would also be applicable for use in parallel hybrid drives as well as the serial drive illustrated and with fuel cell powered vehicles. Because of the high ratio of power to weight capability, low cost and ability to use low cost electronics, the invention is well suited for use in hybrid or electrically driven vehicles. The substantially open center portion of the electrical machine could also potentially be utilized for placement of other components such as a clutch or brake.

Figure 7:
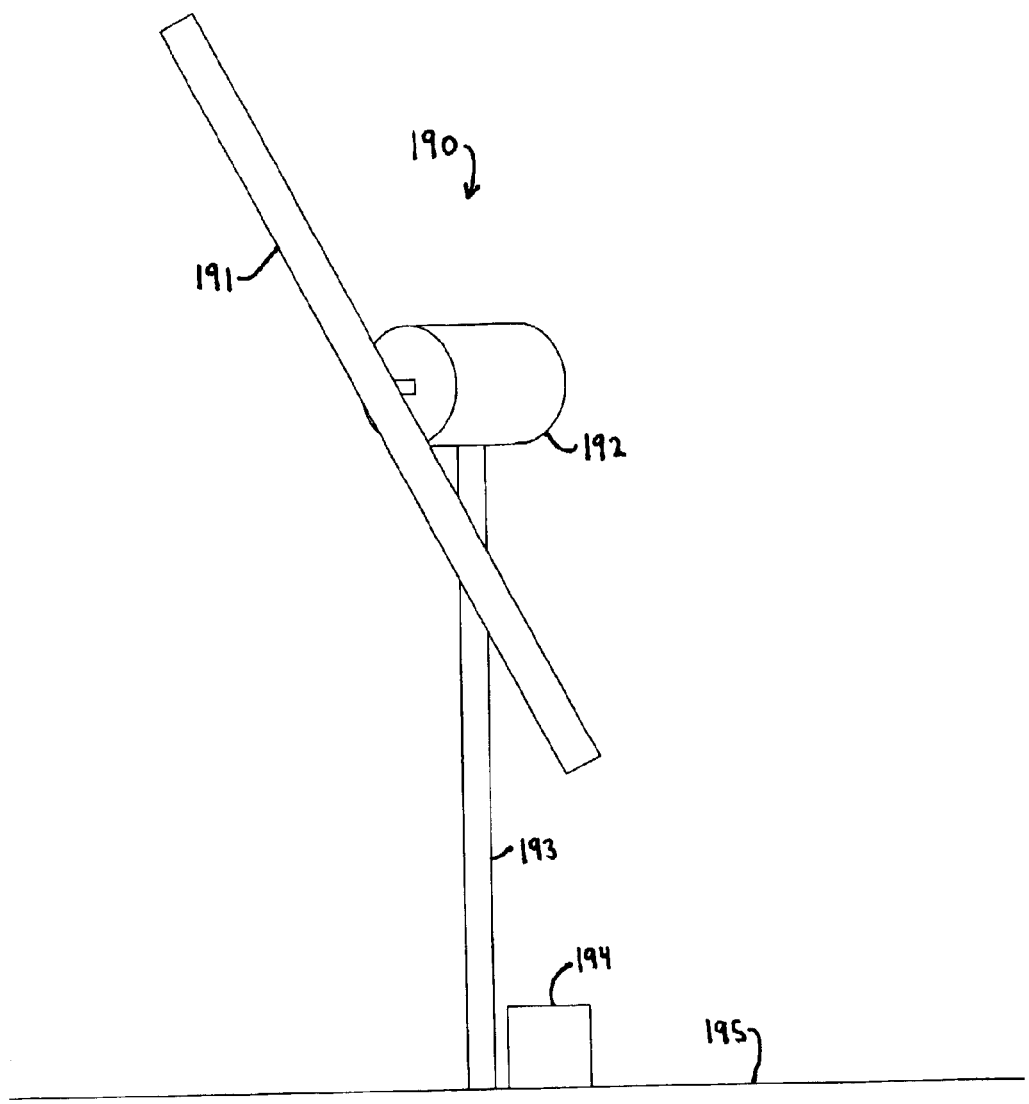
FIG. 7 is a schematic perspective view of a wind generator using a light weight high power electrical machine in accordance with the invention.

A further application for the invention is in wind power generation. A wind turbine electrical generator 190 using an electrical machine in accordance with the invention is shown in FIG. 7 having a wind blade rotor 191 to convert wind into rotational energy. The blade rotor 191 is attached to a light weight high power electrical machine 192, such as those shown in FIGS. 1A, 2, 3, 4 and 10, for generation of electrical power. The electrical machine 192 is supported using a tower or post 193 fixed to the ground 195. The electrical machine 192 provides efficient generation of electrical energy and the field coil makes the power generated controllable for insuring adequate voltage generation and also for limiting the maximum speed of the blade rotor 191. A gearbox, not shown, can be used or alternatively and more preferably, a gearbox need not be used through proper design. Power from the electrical machine 192 is connected to a separate electronics or conversion device 194 to convert the power to the correct frequency and voltage if connected to the electric grid, not shown. The low weight and high power capability make the electrical machine 192 much easier to support on a post 193 and the field coil makes control of power much simpler.

Figure 8:
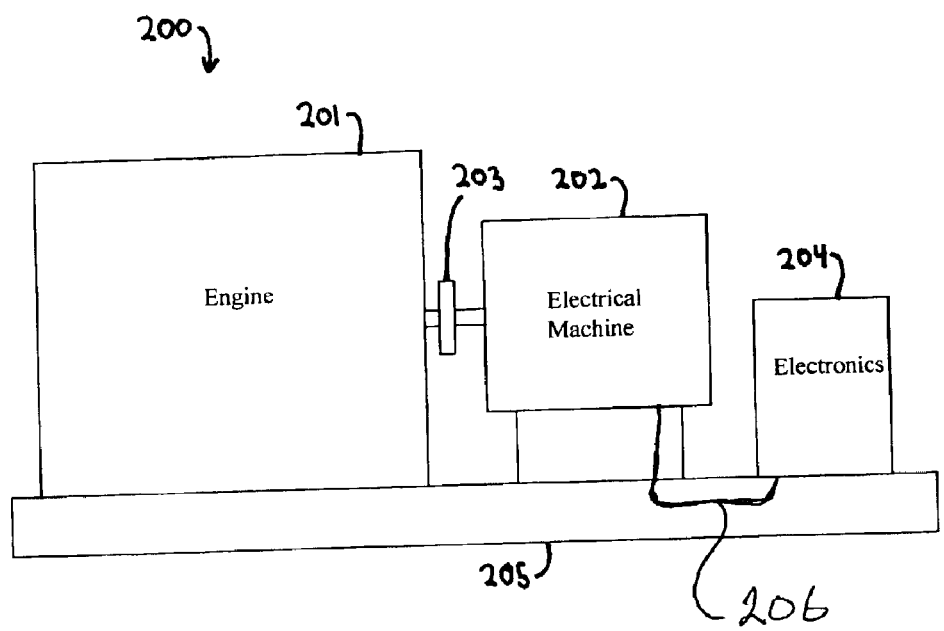
FIG. 8 is a schematic elevation of a continuous power system using a light weight high power electrical machine in accordance with the invention.

The invention can be used in continuous power systems that incorporate an engine for providing extended back up power during interruptions of utility power. Such a continuous power system utilizing an electrical machine in accordance with the invention, is shown in FIG. 8, having an engine 201 that is coupled to a light weight high power electrical machine 202 through the use of a clutch 203. The light weight high power electrical machine 202 may be one of those shown in FIGS. 1A, 2, 3, 4 and 10. Both the engine 201 and electrical machine 202 are mounted on a single frame 205. Also attached to the frame 205 is an electronics module 204 connected to the load and the grid by electrical cables, not shown, and electrically connected to the electric machine by suitable cables 206. The electronics 204 provides synchronous AC power to accelerate and maintain the speed of the electrical machine 202. The clutch 203 is not engaged to rotate the engine 201. When utility power in the grid fails, the electrical machine supplies power by continuing to rotate through its rotational inertia. As the speed falls, the power is increased to the field coil, not shown, inside the electrical machine 202 to maintain a constant voltage. The electronics 204 regulates the process and can also rectify and invert the power from the armature windings, not shown, inside the electrical machine 202. If the interruption continues for more than a few seconds or if the speed of the electrical machine 202 drops below a limit value, the engine 201 is started. Once the engine 201 is running, the clutch 203 connects the engine 201 to the electrical machine 202 to continue generating power for the duration of the interruption. Alternatively, the clutch 203 could be engaged to allow the inertia of the electrical machine 202 to start the engine 201. When utility power is restored in the grid, the electrical machine 202 is accelerated back to full speed through synchronous AC from the electronics 204, and the engine 201 is shut off. Because most engines normally operate below 5000 rpm, the electrical machine operates at a low stress level and it's construction allows for significant reduction in weight or alternatively an increase in power capability for the same weight. Lower weight can extend the life of the bearings used in the electrical machine. The construction of the electrical machine also provides for efficient operation with simple power regulation.

Figure 9:
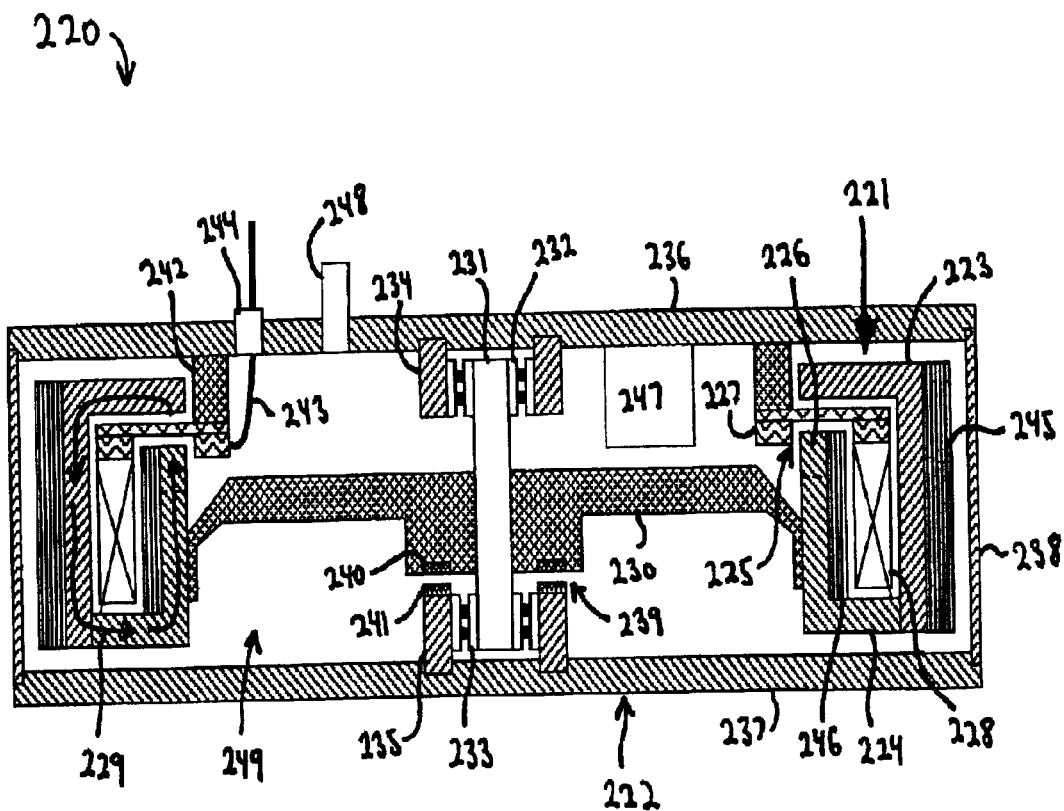
FIG. 9 is a schematic elevation of another flywheel energy storage system using a light weight high power electrical machine in accordance with the invention.

Another flywheel energy storage system, using the light weight high power electrical machine in accordance with the invention, is shown in FIG. 9 having a high speed flywheel, having a flywheel rim 221 connected by a hub 230 to a shaft 231, that rotates in an evacuated chamber 249 inside a sealed container 222. The flywheel rim 221 is constructed of two steel pieces 223, 224 that are interference assembled together to form a rim with hollow core and a slot communicating from the core to the exterior of the rim. The slot forms an armature airgap 225, and multiple circumferentially spaced protrusions 226 are arranged in an equally spaced annular array around the upper inside periphery of the steel piece 224, forming the poles of the motor/generator. An aircore armature 227 having multiple phase windings, not shown, is located in the armature airgap 225. The multiple phase windings can comprise coils or alternatively serpentine paths of windings around the circumference. The windings are preferably wound onto and or bonded to an insulating form preferably constructed of fiberglass. A field coil 228 is located in the hollow core of the flywheel rim 221 and it generates flux that travels in a poloidal flux path 229 when energized by field current.

The flywheel shaft 231 is journalled for rotation in upper and lower mechanical bearings 232, 233 that are supported by housings 234, 235 attached to upper and lower endplates 236, 237. The endplates 236, 237 are connected by an outer tube 238 and together form the vacuum housing 222. To extend the life of the mechanical bearings 232, 233, a magnetic bearing 239 carries axial load. The magnetic bearing 239 is comprised of a ring magnet or annular array of magnets 240 on the underside of the hub, and a ring magnet or annular array of magnets 241 on the top of the lower bearing housing 235. The magnetic polarity of the magnets 240 and 241 is opposite, so they are mutually repelling, thereby supporting the weight of the flywheel.

The armature 227 is attached to the endplate 236 by an armature mount 242, which preferably provides a good thermal conduction path to the container 222 to remove heat during operation. Wires 243 from the armature 227 and field coil 228 exit the container 222 through a sealed connection 244. The chamber 249 inside the container 222 is maintained with a vacuum through the use of a getter 247. An initial pump down and pinch off port 248 allows for establishment of the initial vacuum before sealing the port 248.

In this configuration of flywheel system, the flywheel rim 221 is designed for increased speed operation by utilizing flywheel reinforcement. The two steel pieces 223, 224 are reinforced by high strength composite material or carbon fiber/epoxy bands 245, 246 that reduce the operating stress in the steel. This allows the flywheel 221 to be rotated to higher speeds for storage of more energy and generation of more power. The preferably hoop wound bands 245, 246 can be wound over the steel pieces 223, 224 or more preferably are shrink fitted or press fitted on top for increased interference pressure. Although the outer band 245 is shown to be relatively radially thin for sufficient reinforcement of the outer steel piece 223, the outer composite rim could also be made much thicker or of several assembled rims for storing large amounts of energy.

Figure 10:
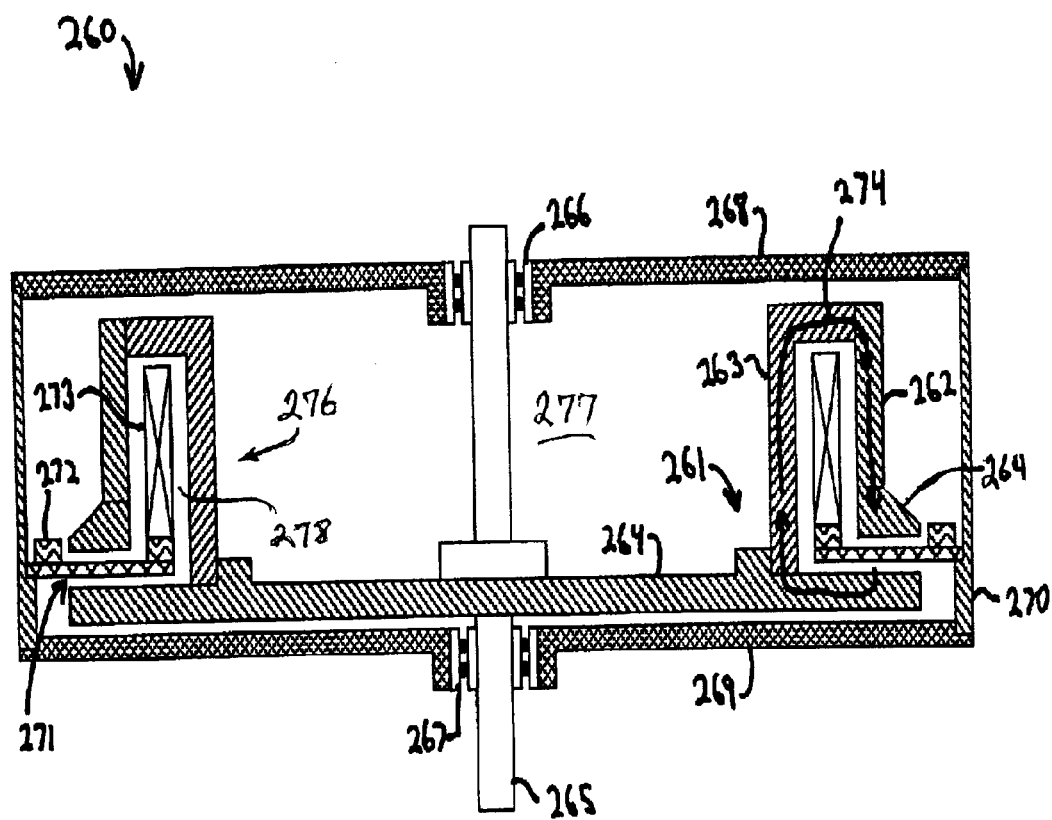
FIG. 10 is a schematic elevation of another configuration light weight high power electrical machine in accordance with the invention.

Another configuration light weight high power electrical machine, shown in FIG. 10, is a motor/alternator 260 comprised of a rotor 261 that is constructed of an annular rim portion 276 and a substantially open center portion 277. The rim 276 is constructed of an inner annular steel piece 262 that is L-shaped in cross section, as shown in FIG. 10, and an outer steel cylindrical piece 263. The rim 276 is connected to a center shaft 265 by a hub 264, the outer radial portion of which, together with the pieces 262 and 263, define a hollow core 278 within the rim 276. A slot communicates between the core 278 and the lower outside radius of the rim 276 and forms a single annular magnetic air gap 271. At least one of the steel pieces 262, 264 has multiple circumferentially spaced protrusions 275 arranged in an equally spaced annular array bounding the magnetic air gap 271 around the rotor 261. A field coil 273 located in the hollow core 278 generates homopolar flux that circulates in a poloidal flux path 274 in the rim 276 and is concentrated by the protrusions 275 into axial rays of flux that rotate with the rotor. An airgap armature 272 is located in the magnetic airgap 271. As the rotor 261 rotates, AC voltage is induced in the windings of the armature 272 by the flux jumping the air gap 274 and passing through the armature 272.

In this configuration of the invention, the specific power of the electrical machine 260, that is, the power-per-unit weight, is increased by having an increased cross sectional area of the magnetic airgap 271. The cross sectional area of the magnetic air gap defined by the protrusions 275 is preferably greater than 50% of the minimum cross sectional area of the poloidal flux path 274 in the rim portion 276. The poles 275 are flanged out, as shown in FIG. 10, to provide increased cross sectional area of the poles 275. This reduces the reluctance of the magnetic air gap 271 and reduces the required size of the field coil for a given power capability or alternatively increases the power capability. The power capability per weight is already increased by the rim portion 276 having an inner diameter that is greater than 50% of the outer diameter of the rim. The rim 276 is connected to a center shaft 265 by the steel plate 264 that also forms part of the rim 276. The shaft 265 is supported by bearings 266, 267 that are mounted with the endplates 268, 269. The endplates 268, 269 are held in position by an outer tube 270 that also supports the armature 272 and field coil 273. To facilitate heat transfer from the field coil 273 and armature 272 to the container 270, thermally conductive epoxy can be utilized and or a preferably thermally conductive, nonmagnetic and nonconducting structure.

The applications shown are not meant to be inclusive. The invention can be employed in numerous applications where the benefits and attributes are desirable. Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein

I claim:

1. A brushless electrical machine, comprising:
    a rotor for rotation about an axis, said rotor being constructed of a rim portion and a substantially hollow a center portion;
    said rim portion being constructed from ferromagnetic material and having a partially hollow core at an inner end of a slot into said hollow core, said slot being defined by opposing surfaces, one of which has multiple, circumferentially spaced protrusions around said rotor;
    a stationary field coil mounted coaxial with said rotor and located in said partially hollow core of said rim portion, said field coil having windings that can be electrically energized to produce homopolar magnetic flux in said protrusions, and said flux circulates in a poloidal flux path in said rim, said poloidal flux path having a single magnetic air gap across said slot;
    a plurality of stationary armature windings located within said magnetic air gap such that said homopolar flux from said protrusions induces an alternating voltage in said armature windings when said rotor rotates.

2. A brushless electrical machine as described in claim 1, wherein:
    the moment of inertia of said rim portion has a value greater than 70% of the value of the moment of inertia of said rotor.

3. A brushless electrical machine as described in claim 2, wherein:
    the moment of inertia of said rim portion has a value greater than 90% of the value of the moment of inertia of said rotor.

4. A brushless electrical machine as described in claim 1, wherein:
    the cross sectional area of said magnetic air gap defined by said protrusions is greater than 50% of the minimum cross sectional area of said poloidal flux path in said rim portion.

5. A brushless electrical machine as described in claim 1, wherein:
    said rim has a height, H in meters, and an inner diameter, ID in meters, wherein said substantially open center portion has a mass, M in kilograms, such that: $M < 500\pi ID^2 H$.

6. A brushless electrical machine as described in claim 1, wherein:
    said rotor rotates inside an enclosed chamber within a container that is maintained at an internal vacuum, and said electrical machine functions as a flywheel energy storage system.

7. A brushless electrical machine as described in claim 1, wherein:
    said rotor is used in an electrically driven vehicle in one or more applications selected from a group consisting of electric power generation by coupling to an engine, energy storage in a flywheel system, and motive power for said electrically driven vehicle.

8. A brushless electrical machine as described in claim 1, wherein:
    said rotor is mechanically driven by a wind turbine blade, such that said electrical machine converts wind energy to electrical energy.

9. A brushless electrical machine as described in claim 1, wherein:
    said electrical machine is used in a continuous power system such that said rotor is attached to an engine through a clutch;
    during normal functioning of utility power, said rotor is rotated by applying synchronous AC electrical power to said armature windings;

during an interruption of utility power, said rotor continues to rotate because of rotational inertia thereof and provides power through said armature windings;

during an extended interruption of utility power, said engine is started, said clutch engages, and said engine rotates said rotor for producing power throughout the duration of the interruption.

10. A brushless electrical machine, comprising:

a rotor for rotation about an axis, said rotor being comprised of a ferromagnetic rim with multiple, circumferentially spaced protrusions around said rotor, and having a slot therein that forms a single magnetic air gap, and an internal cavity in said rim communicating through said slot with an exterior of said rim;

said rim having an inner diameter and an outer diameter, said inner diameter of said rim being spaced from said axis by an open space;

a stationary field coil mounted in said cavity coaxial with said rotor, wherein said field coil has exterior surfaces that are surrounded on three sides by interior surfaces of said cavity such that said field coil produces homopolar flux in said protrusions, and said flux circulates in a poloidal flux path in said rim;

more than one stationary armature windings located within said magnetic air gap such that said homopolar flux from said protrusions crosses said air gap and links said armature windings, inducing an alternating voltage therein when said rotor rotates.

11. A brushless electrical machine, comprising:

a rotor mounted on bearings for rotation about an axis, said rotor having a central supporting structure and a rim formed from at least two ferromagnetic pieces having opposed facing surfaces that, when assembled, define therebetween a hollow core and a slot communicating from said core to an exterior surface of said rim, said opposed facing surfaces in said slot defining a single magnetic air gap between said two pieces;

said rim having an inner diameter and an outer diameter, said inner diameter being spaced apart from said axis by an open space spanned by a hub that connects said rim to said central supporting structure;

multiple circumferentially spaced protrusions around at least at one of said opposed surfaces of said rim in said single magnetic air gap;

a stationary field coil mounted coaxial with said rotor in said hollow core such that said field coil produces homopolar flux in said protrusions;

a plurality of stationary armature windings located within said single magnetic air gap such that said homopolar flux from said protrusions induces an alternating voltage in said armature windings when said rotor rotates.

12. A brushless electrical machine as described in claim 11, wherein:

the moment of inertia of said rim has a value greater than 90% of the total value of the moment of inertia of said rotor.

13. A brushless electrical machine as described in claim 11, wherein:

said rim is constructed from material at least at one surface of said magnetic air gap that provides reduced eddy current loss.

14. A brushless electrical machine as described in claim 11, wherein:

said armature windings are cooled by liquid in a vessel that contains said armature windings.

15. A brushless electrical machine as described in claim 11, wherein:

said armature windings are cooled by air flow which is provided through holes in said rim.

16. A brushless electrical machine as described in claim 11, wherein:

said rotor rotates inside a chamber enclosed within a container that is maintained with an internal vacuum, and said electrical machine functions as a flywheel energy storage system.

17. A brushless electrical machine as described in claim 11, wherein:

said rotor is mounted in an electrically driven vehicle and used for at least one of the following functions: electric power generation by coupling to an engine, energy storage in a flywheel system, and motive power for said electrically driven vehicle.

18. A brushless electrical machine as described in claim 11, wherein:

said rotor is mechanically driven by wind turbine blade such that said electrical machine converts wind energy to electrical power.

19. A brushless electrical machine as described in claim 11, wherein:

said electrical machine is used in a continuous power system such that said rotor is attached to an engine through a clutch;

during normal functioning of utility power, said rotor is rotated by applying synchronous AC electric power to said armature windings;

during an interruption of utility power, said rotor continues to rotate because of its rotational inertia, and provides power through induced voltage armature windings by flux therethrough;

during an extended interruption of utility power, said engine is started, said clutch engages and said engine rotates said rotor for producing power throughout the duration of the interruption.

20. A brushless electrical machine as described in claim 11, further comprising:

a housing containing said rotor and in which said bearings are mounted;

an electrically non-conducting support ring attached to said housing on which said armature windings are supported;

said support ring having sufficient mechanical strength to transmit reaction torque from said armature windings to said housing.

21. A brushless electrical machine as described in claim 11, wherein:

said slot opens axially in said rim.

22. A brushless electrical machine as described in claim 11, wherein:

said slot opens radially in said rim.

23. A brushless electrical machine as described in claim 11, further comprising:

permanent magnets on at least at one of said opposed surfaces of said rim in said single magnetic air gap between each of said circumferentially spaced protrusions.

24. A brushless electrical machine, comprising:

an annular rim supported on a hub for rotation about a center shaft, said rim constituting an annular shell made of two connected ferromagnetic rings, each having an inside diameter spaced from said shaft by at least the radial thickness of said rim, at least one of said rings having a nonplanar cross section;

said rim having an exterior surface and a hollow core communicating with said exterior surface through an annular slot defining a magnetic air gap between opposed, spaced apart surfaces of said two ferromagnetic rings, said ferromagnetic rings and said air gap together providing a poloidal flux path in said rim;

multiple circumferentially spaced protrusions around at least at one of said opposed surfaces facing said magnetic air gap;

a stationary annular field coil in said hollow core and having electrical conductors for connection to a source of electrical power to electrically energize said field coil for generating homopolar flux to circulate in said rim in said poloidal flux path;

a stationary annular armature supported in said magnetic air gap in a position to intersect magnetic flux in said flux path as said rotor rotates about said shaft, and having electrical conductors for connection to a source of electrical power, or operatively to a load, for electrically energizing said armature to generate torque in said rim, or for generating electrical power to said load.

25. A brushless electrical machine for converting between mechanical and electrical energy, comprising:

a rotor supported for rotation about an axis, said rotor having an annular rim spaced apart from said axis and formed from at least two annular ferromagnetic pieces such that said rim, when assembled from said pieces, defines a partially hollow interior core and forms a single magnetic air gap between opposed facing surfaces of said two pieces;

said rotor including a central supporting structure and a hub for connecting said rim to said central supporting structure, wherein said rim has a moment of inertia that is greater than about 90% of the total moment of inertia of said rotor about said axis;

a field coil located in said partially hollow interior core of said rim for generating homopolar flux in a poloidal flux path in said rim around said core when energized by electric current;

circumferentially spaced protrusions projection from one of said facing surfaces around at least at one of said opposed surfaces of said single magnetic air gap for concentrating said flux in rays of flux across said air gap; and multiple stationary armature windings supported in said single magnetic air gap for inducing AC power when said rotor rotates, or for producing torque on said rotor when to said multiple stationary armature windings are energized by synchronous AC power.

* * * * *